(12) United States Patent
Natsukawa (10) Patent No.: US 10,129,371 B2
(45) Date of Patent: Nov. 13, 2018

(54) SERIAL COMMUNICATION DEVICE AND SERIAL COMMUNICATION METHOD

(71) Applicant: Noriyuki Natsukawa, Kanagawa (JP)

(72) Inventor: Noriyuki Natsukawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 147 days.

(21) Appl. No.: 15/185,687

(22) Filed: Jun. 17, 2016

(65) Prior Publication Data

US 2016/0373198 A1 Dec. 22, 2016

(30) Foreign Application Priority Data

Jun. 22, 2015 (JP) .................................. 2015-124482

(51) Int. Cl.
*H04L 29/06* (2006.01)
*H04L 25/14* (2006.01)
*H04L 25/49* (2006.01)

(52) U.S. Cl.
CPC .............. *H04L 69/03* (2013.01); *H04L 25/14* (2013.01); *H04L 25/49* (2013.01)

(58) Field of Classification Search
None
See application file for complete search history.

(56) References Cited

U.S. PATENT DOCUMENTS

| 4,486,739 | A | 12/1984 | Franaszek et al. |
| 7,535,844 | B1 * | 5/2009 | Gulstone ............... H04J 3/0608 370/229 |
| 2009/0041099 | A1 * | 2/2009 | Das Sharma ....... H04L 25/4908 375/220 |
| 2014/0325107 | A1 * | 10/2014 | Iwatsuki ................... G06F 1/10 710/124 |
| 2015/0222290 | A1 | 8/2015 | Miyadera et al. |

FOREIGN PATENT DOCUMENTS

| JP | 2011-019188 | * | 1/2011 | ............... H04N 1/00 |
| JP | 2015-146525 | | 8/2015 | |

* cited by examiner

*Primary Examiner* — Chirag G Shah
*Assistant Examiner* — Srinivasa R Reddivalam
(74) *Attorney, Agent, or Firm* — Cooper & Dunham LLP (57) ABSTRACT

A serial communication device includes a serializer configured to transmit serial data for each channel via a transmission line for the corresponding channel, and a deserializer configured to receive the serial data. The serializer includes a transmission processing circuit that creates a protocol where pieces of valid data are inserted between a start frame and an end frame for each channel. The deserializer includes buffers for the respective channels to detect the start frame of each channel, store the valid data in the corresponding buffer, set, as a to-be-processed buffer, at least one buffer that stores the valid data on a channel to be deskewed, start externally transferring data from the to-be-processed buffer when a fixed amount of the valid data is stored or when the end frame is detected, detect a boundary between the valid data and the end frame, and extract the valid data from the to-be-processed buffer.

8 Claims, 9 Drawing Sheets

| SYMBOL NAME | DATA BYTE NAME | DATA BYTE VALUE (hex) | 8B [HGF EDCBA] | 10B RD- [abcdei fghj] | 10B RD+ [abcdei fghj] | DESCRIPTION |
|---|---|---|---|---|---|---|
| COM | K28.5 | BC | 101 11100 | 001111 1010 | 110000 0101 | Inter-Line Data (DES Syn Symbol) |
| STP1 | K23.7 | F7 | 111 10111 | 111010 1000 | 000101 0111 | Line-Data Start Symbol 1 |
| STP2 | K27.7 | FB | 111 11011 | 110110 1000 | 001001 0111 | Line-Data Start Symbol 2 |
| STP3 | K29.7 | FD | 111 11101 | 101110 1000 | 010001 0111 | Line-Data Start Symbol 3 |
| STP4 | K30.7 | FE | 111 11110 | 011110 1000 | 100001 0111 | Line-Data Start Symbol 4 |
| STP5 | K28.7 | FC | 111 11100 | 001111 1000 | 110000 0111 | Line-Data Start Symbol 5 |
| END1 | K28.0 | 1C | 000 11100 | 001111 0100 | 110000 1011 | Line-Data End Symbol 1 |
| END2 | K28.1 | 3C | 001 11100 | 001111 1001 | 110000 0110 | Line-Data End Symbol 2 |
| END3 | K28.2 | 5C | 010 11100 | 001111 0101 | 110000 1010 | Line-Data End Symbol 3 |
| END4 | K28.3 | 7C | 011 11100 | 001111 0011 | 110000 1100 | Line-Data End Symbol 4 |
| END5 | K28.4 | 9C | 100 11100 | 001111 0010 | 110000 1101 | Line-Data End Symbol 5 |
| - | K28.6 | DC | 110 11100 | 001111 0110 | 110000 1001 | - |

SERIAL COMMUNICATION DEVICE AND SERIAL COMMUNICATION METHOD

CROSS-REFERENCE TO RELATED APPLICATION

The present application claims priority under 35 U.S.C. § 119 to Japanese Patent Application No. 2015-124482 filed on Jun. 22, 2015. The contents of which are incorporated herein by reference in their entirety.

BACKGROUND OF THE INVENTION

1. Field of the Invention

The present invention relates to serial communication technique, and in particular, relates to serial communication device and method suitable for carrying out simplex serial communication over transmission lines between a transmitter and a receiver.

2. Description of the Related Art

A scheme for enabling serial communication devices, which conventionally carry out simplex communications, to detect a receipt error has beer, known. This scheme includes implementing a protocol (hereinafter, "frame") including a plurality control symbols indicating a start of data transfer at a front end (representing a start frame) of valid data and a plurality of control symbols indicating an end of data transfer at a back end (representing an end frame) of the valid data, and performing data transfer from a serializer to a deserializer.

For instance, Japanese Laid-open Patent Publication No. 2011-019188 discloses an implementation method for detecting an receipt error state by causing valid data to have, at its front end (indicating "Start"), a plurality of control symbols indicating a start of data transfer and, at its back end (indicating "END"), a plurality of control symbols indicating an end of data transfer.

However, when communication is carried out using a plurality of channels (lanes), an error caused by jitter noise can occur in the deserializer arranged at a receiver.

Frequency-deviation accommodation, deskew adjustment, and deframing required to prevent occurrence of this error arise a problem of an increase in power consumption resulting from an increase in circuit size of a high-frequency operating circuit portion.

The technique disclosed in Japanese Laid-open Patent Publication No. 2011-019188 also requires that the deserializer should perform deframing, lane-to-lane deskew adjustment, and frequency-deviation accommodation when communication is carried out using a plurality of lanes, and cannot solve the problem of an increase in power consumption resulting from an increase in circuit size of a high-frequency operating circuit portion.

SUMMARY OF THE INVENTION

According to one aspect of the present invention, a serial communication device includes a serializer configured to transmit serial data for each of a plurality of channels via a transmission line for the corresponding channel, and a deserializer configured to receive the serial data. The serializer includes a transmission processing circuit configured to create a protocol where a plurality of pieces of valid data are inserted between a data-transmission start frame and a data-transmission end frame for each of the channels. The deserializer includes a receipt processing circuit that includes a plurality of receiving buffer circuits for the respective channels. The receipt processing circuit is configured to detect, the data-transmission start frame of each channel, store the valid data in the corresponding receiving buffer circuit, set, as a to-be-processed receiving buffer circuit, at least one of the receiving buffer circuits that stores the valid data on a channel to be deskewed, start externally transferring data from the to-be-processed receiving buffer circuit when a fixed amount of the valid data is stored or when the data-transmission end frame is detected, detect a boundary between the valid data and the data-transmission end frame, and extract the valid data from the to-be-processed receiving buffer circuit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An aspect of the present invention is configured as follows to reduce power consumption.

A serial communication device according to an aspect of the present invention includes a serializer configured to transmit serial data for each of a plurality of channels via a transmission line for the corresponding channel, and a deserializer configured to receive the serial data. The serializer includes a transmission processing circuit configured to create a protocol where a plurality of pieces of valid data are inserted between a data-transmission start frame and a data-transmission end frame for each of the channels. The deserializer includes a receipt processing circuit that includes a plurality of receiving buffer circuits for the respective channels. The receipt processing circuit is configured to detect the data-transmission start frame of each channel, store the valid data in the corresponding receiving buffer circuit, set, as a to-be-processed receiving buffer circuit, at least one of the receiving buffer circuits that stores the valid data on a channel to be deskewed, start externally transferring data from the to-be-processed receiving buffer circuit when a fixed amount of the valid data is stored or when the data-transmission end frame is detected, detect a boundary between the valid data and the data-transmission end frame, and extract the valid data from the to-be-processed receiving buffer circuit.

The serial communication device configured as described above can contribute to reduction in power consumption.

Features of the present invention described above are described in detail below with reference to the accompanying drawings.

First Embodiment

A serial communication device 10 according to a first embodiment of the present invention is described below.

Figure 1:
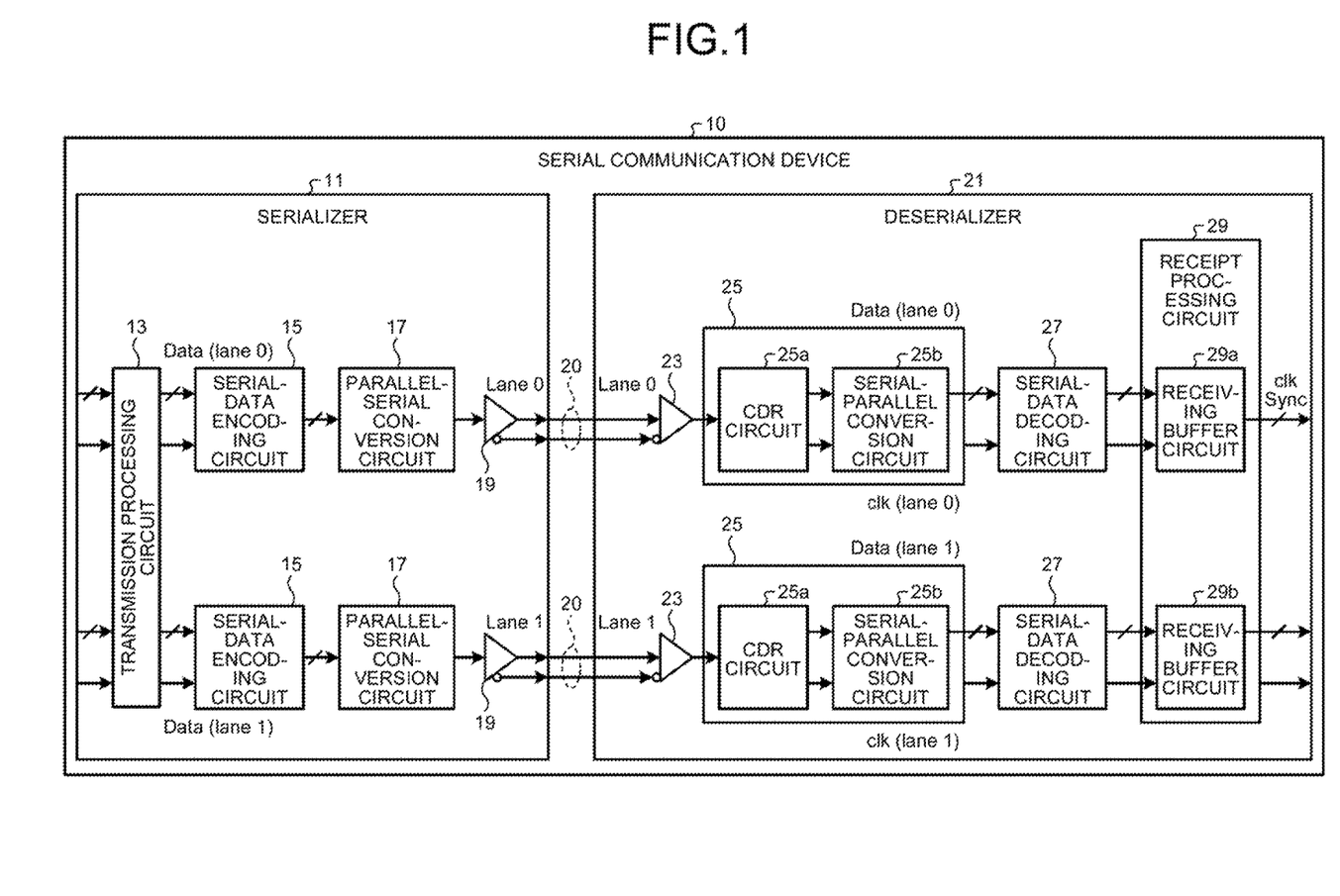
FIG. 1 is a block diagram illustrating a configuration of a serial communication device according to a first embodiment of the present invention.

FIG. 1 is a block diagram illustrating a configuration of the serial communication device 10 according to the first embodiment.

The serial communication device 10 illustrated in FIG. 1 includes a serializer 11 at a transmitter and a deserializer 21 at a receiver. Lanes 0 and 1 are provided for parallel data fed to the serializer 11 using two channels (lanes). The serializer 11 outputs clocked serial data to the deserializer 21 over dual-channel transmission lines 20.

The serializer 11 includes, in addition to a transmission processing circuit 13, two (dual-channel) serial-data encoding circuits 15, parallel-serial conversion circuits 17, and driver circuits 19.

The transmission processing circuit 13 including two transmitting buffer circuits is an interface circuit for externally-fed data. The transmission processing circuit 13 temporarily stores the externally-fed data in the transmitting buffer circuits and reads out the data in sequence, thereby performing framing and lane-to-lane skew adjustment.

The serial-data encoding circuit 15 employs one encoding circuit, such as an 8B/10B encoding circuit, a 64B/66B encoding circuit, a 64B/67B encoding circuit, a 128B/130B encoding circuit, a TMDS (Transition Minimized Differential Signaling) circuit, and a serializer circuit, to perform serial data encoding.

The 8B/10B encoding circuit converts 8-bit data into 10-bit encoded data.

The 64B/66B encoding circuit converts 64-bit data into 66-bit encoded data.

The 64B/67B encoding circuit converts 64-bit data into 67-bit encoded data.

The 128B/130B encoding circuit converts 128-bit data into 130-bit encoded data.

The TMDS circuit transmits a differential clock signal from the transmitter to the receiver.

The parallel-serial conversion circuit 17 converts parallel data into serial data and, furthermore, applies pre-emphasis.

The driver circuit 19 transmits the serialized data to the transmission line 20 using a differential signal (Tx+/Tx−).

The deserializer 21 includes receiver circuits 23, serial-parallel converting circuits 25, serial-data decoding circuits 27, and a receipt processing circuit 29.

The receiver circuit 23 recovers the serial data by receiving the differential signal transmitted from the serializer 11 and binarizing the differential signal.

The serial-parallel converting circuit 25 includes a CDR (Clock and Data Recovery) circuit 25a and a serial-parallel conversion circuit 25b. The CDR circuit 25a detects edges of the binarized serial data and performs phase adjustment to an internal clock, thereby outputting clocked serial data to the serial-parallel conversion circuit 25b.

The serial-parallel conversion circuit 25b converts the serial data incoming from the CDR circuit 25a into parallel data and outputs the parallel data.

The serial-data decoding circuit 27 employs one decoding circuit, such as an 8B/10B decoding circuit, a 64B/66B decoding circuit, a 64B/67B decoding circuit, a 128B/130B decoding circuit, a TMDS (Transition Minimized Differential Signaling) circuit, and a deserializer circuit, to perform serial data decoding.

The 8B/10B decoding circuit is a circuit that decodes the 10-bit data, which is encoded by the serializer, to its original 8-bit data.

The 64B/66B decoding circuit is a circuit that decodes the 66-bit data, which is encoded by the serializer, to its original 64-bit data.

The 64B/67B decoding circuit is a circuit that decodes the 67-bit data, which is encoded by the serializer, to its original 64-bit data.

The 128B/130B decoding circuit is a circuit that decodes the 130-bit data, which is encoded by the serializer, to its original 128-bit data.

The TMDS circuit recedes the differential clock signal.

The serial-data decoding circuit 27 includes a frequency-lock detecting circuit and a symbol-boundary detecting circuit for the received data.

The receipt processing circuit 29 including receiving buffer circuits 29a and 29b synchronizes the decoded serial data to the clock in sequence and stores the data in the receiving buffer circuits 29a and 29b to perform lane-to-lane deskew as deframing and to accommodate frequency deviation.

Figure 2:
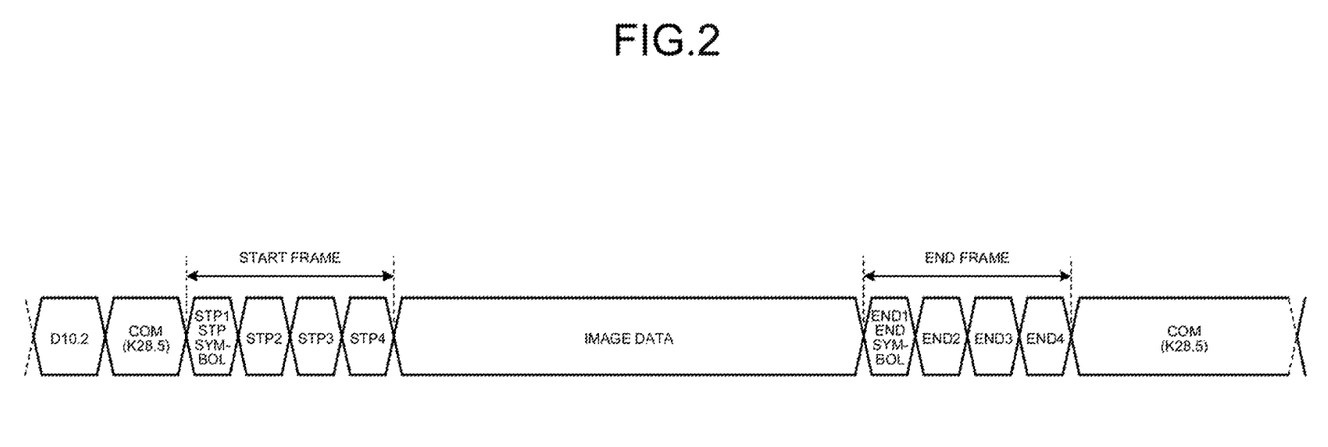
FIG. 2 is a diagram for describing a method for the serial communication device according to the first embodiment for detecting the position of valid data using control codes.

FIG. 2 is a diagram for describing a method for the serial communication device according to the first embodiment for detecting the position of valid data using control codes.

As illustrated in FIG. 2, the serializer 11 inserts control codes "STP1", "STP2", "STP3", and "STP4" indicating a start frame to the front of valid data and inserts control codes "END1", "END2", "END3", and "END4" indicating an end frame to the end of the valid data so that the valid data can be detected.

The control code "STP1" is a control code indicating that valid data starts after four cycles. Similarly, the control code "STP2" is a control code indicating that valid data starts after three clock cycles; the control code "STP3" is a control code indicating that valid data starts after two clock cycles; the control code "STP4" is a control code indicating that valid data starts from the next clock cycle.

The control code "END1" is a control code indicating that valid data ends before one clock cycle of this code. Similarly, the control code "END2" is a control code indicating that valid data ends before two clock cycles of this code; the control code "END3" is a control code indicating that valid data ends before three clock cycles of this code; the control code "END5" is a control code indicating that valid data ends before four clock cycles of this code.

In the first embodiment, the number of the control codes before valid data and that after the valid data are both four; however, the number of the control codes inserted to precede the valid data and that inserted to follow the valid data are not limited to four and, furthermore, the number of the control codes inserted to precede the valid data and that inserted to follow the valid data may be different.

As a K code, which is standard data for serial-data encoding and serial-data decoding, the control code "COM" illustrated in FIG. 2, standard data used in an 8B/10B encoding circuit, for example, is adopted for reference purpose. The first embodiment is described on an assumption that symbol lock is achieved by detecting the K code "COM" (K28.5).

Referring to Japanese Laid-open Patent Publication No. 2011-019188, the control codes "STP1", "STP2", "STP3", and "STP4" are an example of a protocol to be added as a frame to the front end of image data as symbols indicating a start of data transfer and are an example of communication data representing a start frame with the four "STP"-related symbols.

The control codes "END1". "END2", "END3", and "END4" are an example of a protocol to be added as a frame to the end of image data and are an example of communication data representing an end frame with the four "END"-related symbols.

The number of the "STP" control codes may preferably be variable from one to its full number so that, when the receipt processing circuit 29 of the deserializer 21 performs receipt processing, the receipt processing circuit 29 can detect a data-receipt start frame as follows. The receipt processing circuit 29 determines that the "Start" control code is detected upon receiving two or more of the "STP" control codes.

The number of the "END" control codes may preferably be variable from one to its full number, and the receipt processing circuit 29 may determine that the "End" control code is detected upon receiving two or more of the "END" control codes.

The above-described protocol for packet data is only an example. The number of the control codes, code lengths, and the like are variable and no specific requirement is imposed thereon.

Figure 7:
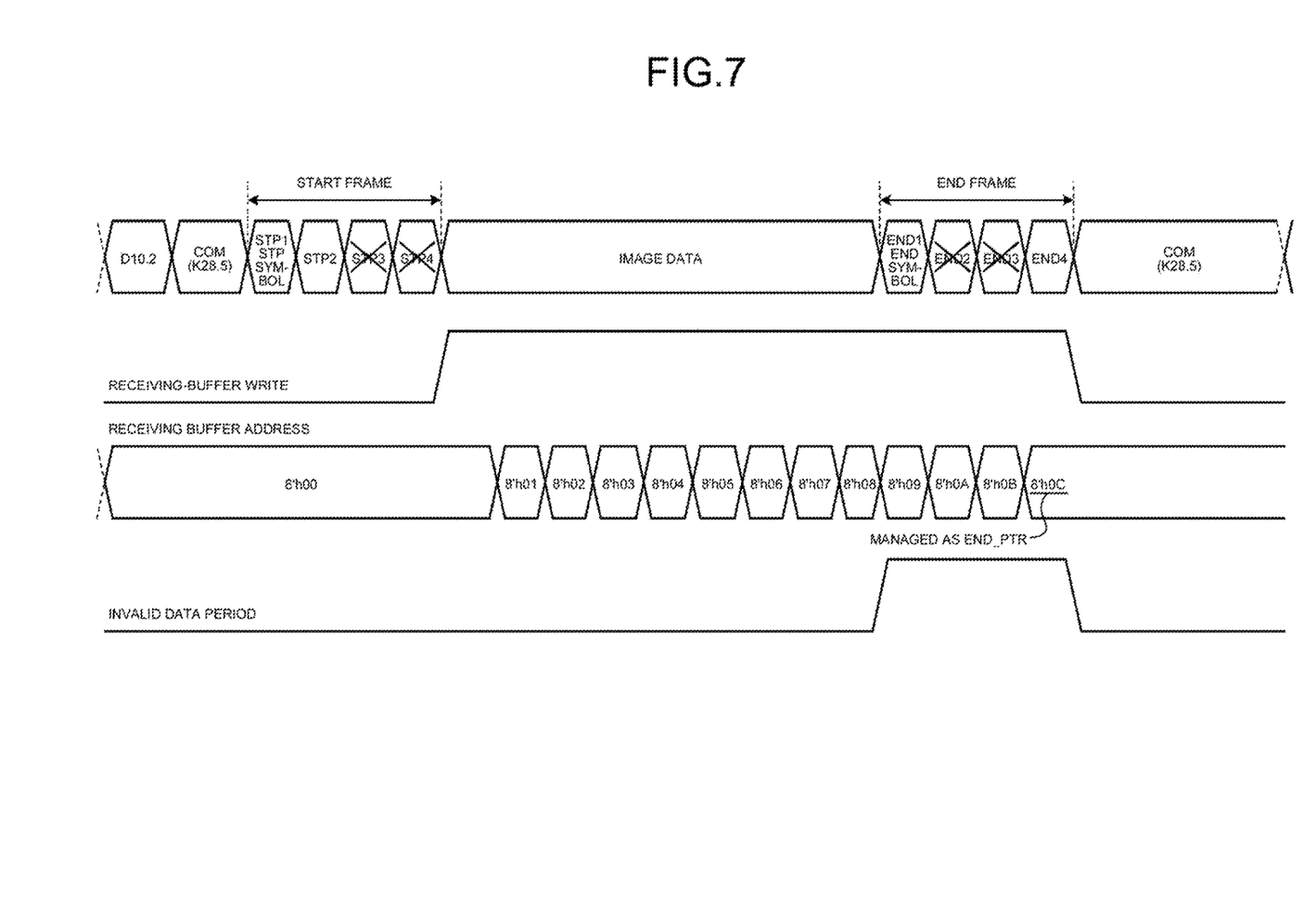
FIG. 7 is a diagram for describing example frame implementation and a method for detecting the position of valid data related to data transfer of the serial communication device according to the third embodiment.

For example, such a protocol as that illustrated in FIG. 7 may be implemented. As illustrated in FIG. 7, a configuration where specific data is inserted to between the "STP" symbols and between the "END" symbols may be employed.

Second Embodiment

The deserializer 21 of the serial communication device 10 according to a second embodiment of the present invention is described below. In the second embodiment, as illustrated in FIG. 3, two lanes (lanes 0 and 1) (channels) are implemented.

Figure 3:
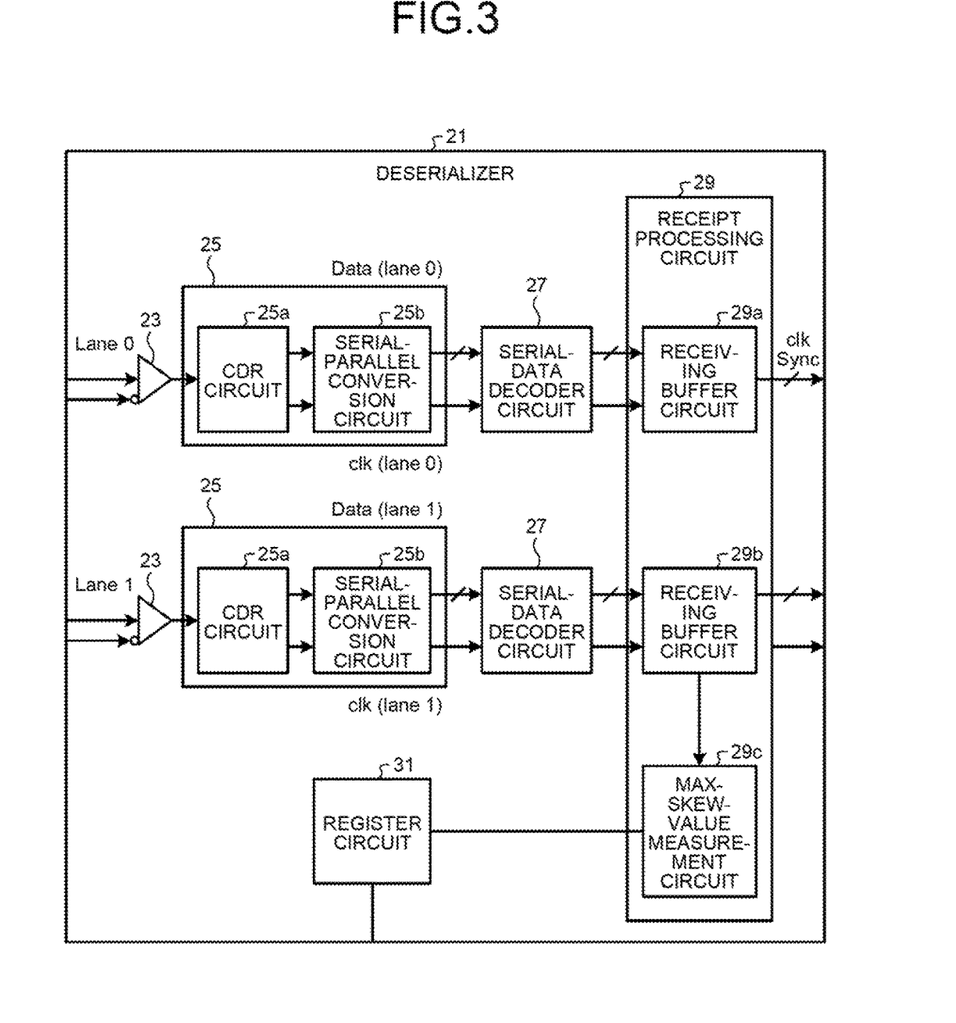
FIG. 3 is a schematic diagram for describing a detraining circuit, a lane-to-lane deskew circuit, and a frequency-deviation accommodating circuit of a receipt processing circuit illustrated in FIG. 1.

FIG. 3 is a schematic diagram for describing a deframing circuit, a lane-to-lane deskew circuit, and a frequency-deviation accommodating circuit of the receipt processing circuit 29 illustrated in FIG. 1.

The second embodiment differs from the first embodiment in that the receipt processing circuit 29 includes a max-skew-value measurement circuit and that the deserializer 21 further includes a register circuit 31.

As illustrated in FIG. 3, when a plurality of lanes (channels) are provided, serial data incoming from the receiver circuit 23 is fed to the CDR circuit. 25a. The CDR circuit 25a synchronizes the serial data to a clock and outputs it to the serial-parallel conversion circuit 25b. The serial-parallel conversion circuit 25b converts the serial data incoming from the CDR circuit 25a into parallel data and outputs the parallel data.

The CDR circuit 25a performs clock recovery from the clock embedded in the data and recovers the data, and performs serial data transfer. The serial-parallel conversion circuit 25b converts the serial data into parallel data and transfers the parallel data to the serial-data decoding circuit 27 downstream.

The serial-data decoding circuit 27 decodes the encoded serial data. Specifically, the serial-data decoding circuit 27 performs decoding by performing, using the frequency-lock detecting circuit, frequency-lock detection on the serial data and performing, using the symbol-boundary detecting circuit, symbol boundary detection.

The serial-data encoding circuit 27 employs one decoding circuit, such as an 8B/10B decoding circuit, a 64B/66B decoding circuit, a 64B/67B decoding circuit, a 128B/130B decoding circuit, and a TMDS circuit, for the serial data decoding.

The receipt processing circuit 29 including the receiving buffer circuits 29a and 29b stores the decoded serial data in the receiving buffer circuits 29a and 29b to perform lane-to-lane deskew as deframing and to accommodate frequency deviation.

Specifically, the receipt processing circuit 29 performs deframing by not writing the variable-length "STP" control codes to the receiving buffer circuit 29a, 29b.

The receipt processing circuit 29 writes a variable-length "END" control cede to the receiving buffer circuit 29a, 29b until a plurality of "END" control codes are detected and, after detecting "END" after detecting a plurality of "END" control codes, the receipt processing circuit 29 performs processing to be performed when invalid data is written.

The deserializer 21 transfers data downstream simultaneously with lane-to-lane deskew, which is performed by the receipt processing circuit 29. Therefore, in a situation where the receiving buffer circuits 29a and 29b require lane-to-lane deskew adjustment, the deserializer 21 starts transferring data to a higher layer when a preset amount of data is accumulated in the receiving buffer circuit 29a, 29b or when the "END" frame is detected by the receipt processing circuit 29.

A max-skew-value measurement circuit 29c makes comparison, between the channels (lanes), of a write point value indicating the number of cells, writing to which is completed, of the to-be-processed receiving buffer circuit 29a (or 29b) or a read pointer value indicating the number of cells, reading from which is completed, and measures a maximum skew value between the channels using a result of the comparison.

The max-skew-value measurement circuit 29c stores the measured max skew value in the register circuit 31.

The register circuit 31, which is a register circuit for storing the maximum skew value measured by the max-skew-value measurement circuit 29c, is connected to a data bus of an external CPU (Central Processing Unit) and supplies the maximum skew value when the maximum skew value is read out by the CPU.

The register circuit 31 also stores data representing a usable number of cells, which is set from the external CPU, of each of the receiving buffer circuits and outputs the usable number of cells to the receipt processing circuit 29, thereby variably setting the amount of data to be stored in the receiving buffer circuit 29a, 29b.

The externally connected CPU can change the amount of data to be stored in the receiving buffer circuit 29a, 29b in this manner, thereby achieving low latency and controlling the amount of skew of the serializer 11, which is the transmitter.

Figure 4:
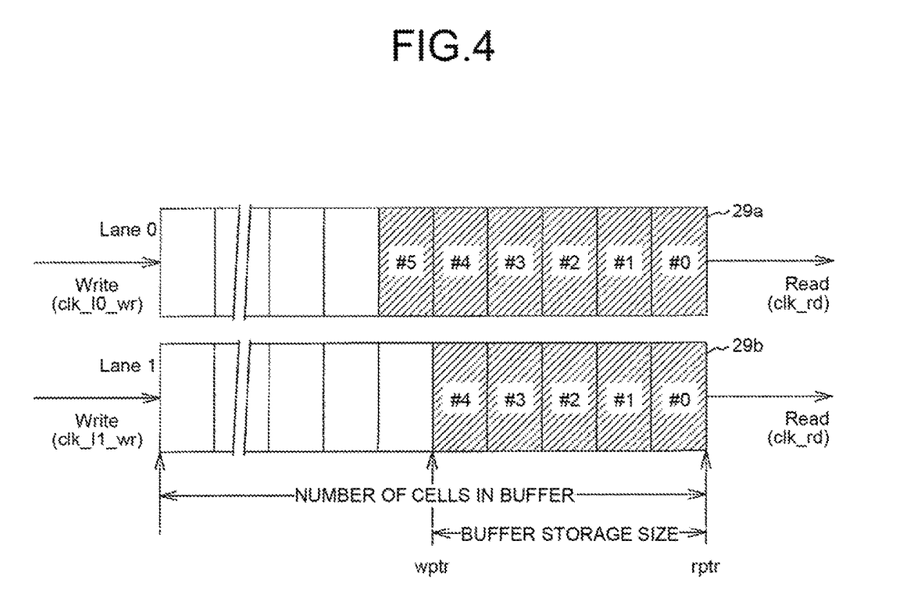
FIG. 4 is a schematic diagram for describing operations of receiving buffer circuits included in the receipt processing circuit illustrated in FIG. 3.

FIG. 4 is a schematic diagram for describing operations of the receiving buffer circuits 29a and 29b included in the receipt processing circuit 29 illustrated in FIG. 3.

As illustrated in FIG. 4, parallel data output from the serial-data decoding circuits 27 and 27 is written to buffer ceils of the receiving buffer circuits 29a and 29b, respectively, while being clocked.

In each of the receiving buffer circuits 29a and 29b, a plurality of cells, the number of which is equal to the number of the buffer cells, are connected in series. The number of cells where data is stored in the receiving buffer circuit is referred to as "buffer storage size"; a pointer value indicating the number of cells, writing to which is completed, is referred to as "wptr value"; a pointer value indicating the number of cells, reading from which is completed, is referred to as "rptr value". The receipt processing circuit 29 manages the wptr values and the rptr values and updates the wptr value or the rptr value when writing or reading is performed in accordance with the procedure indicated by the flowchart illustrated in FIG. 6.

Figure 6:
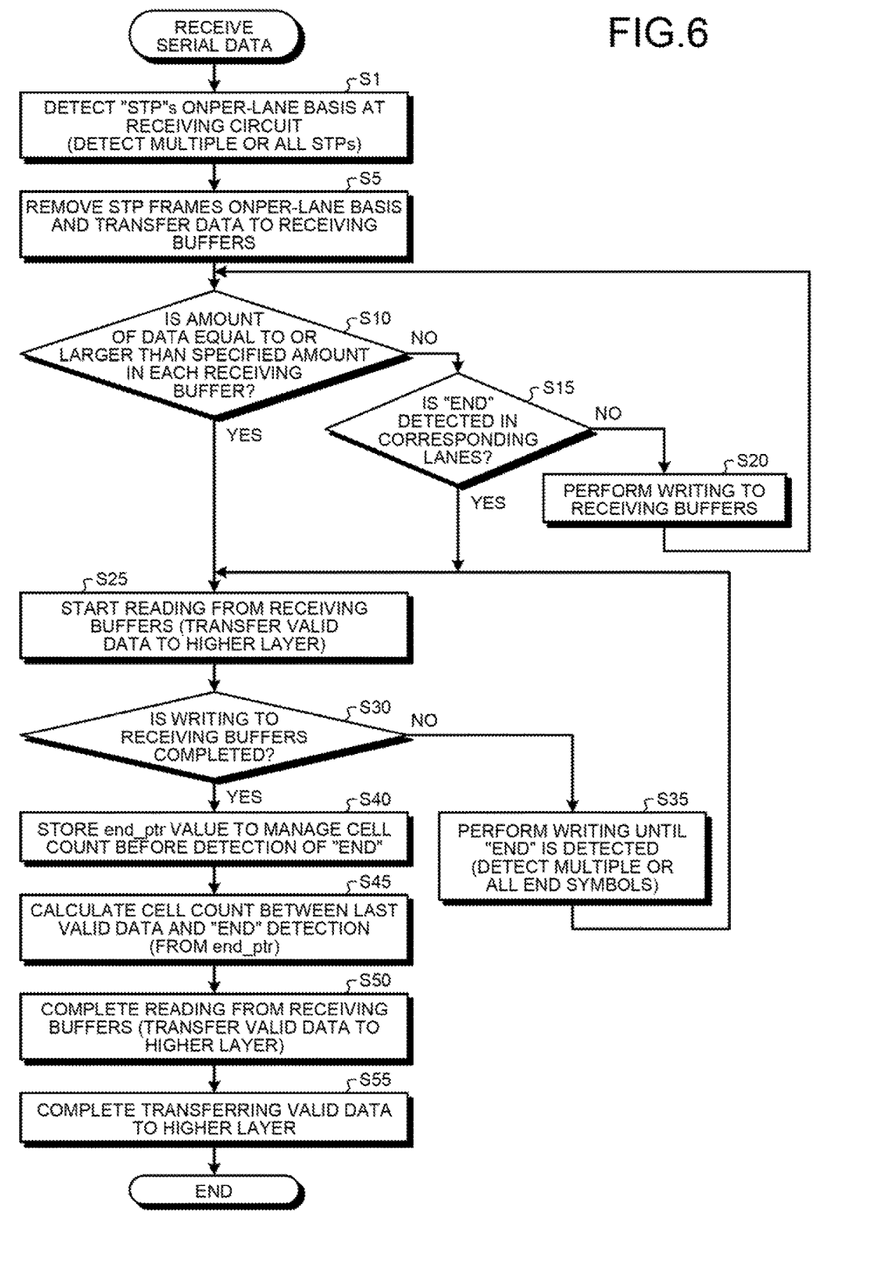
FIG. 6 is an operation flowchart illustrating a receipt processing operation performed by a receipt processing circuit included in a deserializer according to the third embodiment.

The receiving buffer circuits 29a and 29b perform lane-to-lane deskew on the two lanes (channels) in such a manner that, when both data being written on the lane 0 and data being written on the lane 1 exceed the storage size, which is variable, of the receiving buffer circuit 29a and that of the receiving buffer circuit 29b reading is started (see FIG. 6).

Also when the "END" control code is detected on all the lanes, on which lane-to-lane deskew is to be performed, it is determined that data transfer is completed on all the lanes and data reading is started.

The thus-read data is transferred from the receiving buffer circuit 29a, 29b to a higher layer as valid data in accordance with a read clock (clk_rd).

Third Embodiment

Figure 5:
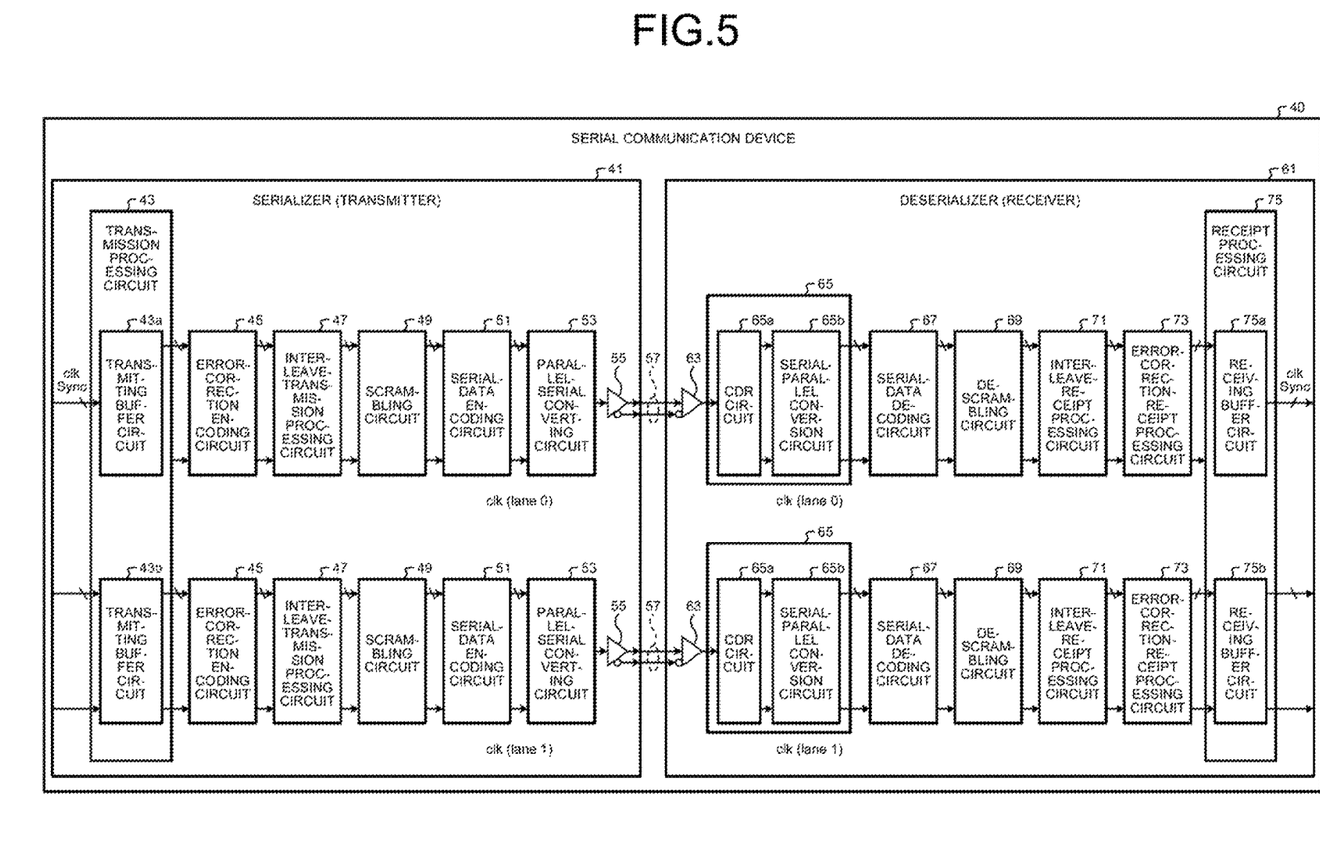
FIG. 5 is a block diagram illustrating a configuration of a serial communication device according to a third embodiment of the present invention.

FIG. 5 is a block diagram illustrating a configuration of a serial communication device 40 according to a third embodiment of the present invention.

The serial communication device 40 illustrated in FIG. 5 includes a serializer 41 at a transmitter and a deserializer 61 at a receiver.

The serializer 41 illustrated in FIG. 5 includes a transmission processing circuit 43, error-correction encoding circuits 45, interleave-transmission processing circuits 47, scrambling circuits 49, serial-data encoding circuits 51, parallel-serial converting circuits 53, and driver circuits 55.

The transmission processing circuit 43, which is an interface that manages transmission of transmission-valid data, performs transmission processing as follows. The transmission processing circuit 43 receives transmission-valid data and a clock from a higher layer, stores the valid data in transmitting buffer circuit 43a, 43b, performs skew adjustment with the other lane, and adds frames as illustrated in FIG. 2.

The error-correction encoding circuit 45 performs error-correction encoding (RS (Reed-Solomon) Encoding) on the data incoming from the transmission processing circuit 43, adds data representing an error correcting code to the data, and outputs the data.

The interleave-transmission processing circuit 47 achieves data transfer with increased immunity to burst noise by performing interleaving on the data incoming from the error-correction encoding circuit 45 to change a sequence of the data.

The scrambling circuit 49 prevents occurrence of periodic patterns on the transmission line to reduce occurrence of jitter by performing scrambling or the data incoming from the interleave-transmission processing circuit 47 or, more specifically, randomizing valid data in conformity with a certain rule.

The serial-data encoding circuit 51 employs one encoding circuit, such as an 8B/10B encoding circuit, a 64B/66B encoding circuit, a 64B/67B encoding circuit, a 128B/130B encoding circuit, and a TMDS circuit, for serial-data encoding of the data incoming from the scrambling circuit 49.

The parallel-serial converting circuit 53 converts the parallel data incoming from the serial-data encoding circuit 51 into serial data.

The driver circuit 55 transmits the serialized data to a transmission line 57 using a differential signal (Tx+/Tx−).

The deserializer 61 illustrated in FIG. 5 includes receiver circuits 63, deserializer circuits 65, serial-data decoding circuits 67, descrambling circuits 69, interleave-receipt processing circuits 71, error-correction-receipt processing circuits 73, and a receipt processing circuit 75.

The receiver circuit 63 receives the serial data transmitted over the transmission line 57 from the driver circuit 55 included in the serializer 41 and outputs the serial data to the deserializer circuit 65.

The deserializer circuit 65 includes a CDR circuit 65a and a serial-parallel conversion circuit 65b. The CDR circuit 65a performs clock recovery from the clock embedded in the data. The serial-parallel conversion circuit 65b converts the serial data into parallel data.

The serial-data decoding circuit 67 employs one decoding circuit, such as an 8B/10B decoding circuit, a 64B/66B decoding circuit, a 64B/67B decoding circuit, a 128B/130B decoding circuit, and a TMDS circuit, for serial-data decoding of the data incoming from the deserializer circuit 65.

The descrambling circuit 69 descrambles the data, in which the valid data is scrambled at the transmitter, incoming from the serial-data decoding circuit 67.

The interleave-receipt processing circuit 71 de-interleaves the data, data sequence of which is changed by the interleaving at the transmitter, incoming from the descrambling circuit 69 to thereby recover the original sequence of the data.

The error-correction-receipt processing circuit 73 performs, when an error is detected on the basis of the error correcting code added at the transmitter, error correction on the data incoming from the interleave-receipt processing circuit 71 and removes the error correcting code.

The receipt processing circuit 75 including receiving buffer circuits 75a and 75b removes frames added at the transmitter from the data incoming from the error-correction-receipt processing circuit 73, performs lane-to-lane deskew on the data, and transfers the data to a higher layer. The receipt processing circuit 75 performs processing as does the receipt processing circuit 29 illustrated in FIG. 3.

FIG. 6 is an operation flowchart illustrating a receipt processing operation performed by the receipt processing circuit 75 included in the deserializer 61 according to the third embodiment.

The receipt processing circuit 75 of the deserializer 61 operates in accordance with the operation flowchart illustrated in FIG. 6.

Serial data transferred from the serializer 41 is fed to the deserializer circuit 65, where the data is processed by the receiver circuit 63, the deserializer circuit 65, the serial-data decoding circuit 67, the descrambling circuit 69, the interleave-receipt processing circuit 71, and the error-correction-receipt processing circuit 73 in this order and fed to the receipt processing circuit 75.

Receipt processing is performed on the data fed to the receipt processing circuit 75 in accordance with the sequence illustrated in FIG. 6. The following description is made on an assumption that data, to which frames are added, is transferred from the serializer 41 facing the deserializer 61.

At S1, the receipt processing circuit 75 detects the "STP" control codes on a per-lane basis using a receiving circuit. The receipt processing circuit 75 may be configured to detect all "STP"-related symbols specified at the transmitter to detect the "STP" control code and may be implemented with a circuit configuration that allows selecting the number of the "STP"-related symbols to be detected.

At S5, the receipt processing circuit 75 removes a frame (s) containing the detected "STP" control code and stores valid data in the receiving buffer circuit.

At S10, the receipt processing circuit 75 determines whether or not data of an amount equal to or larger than a preset amount is stored in each of the receiving buffer circuits, the storage area of which is variably controllable, on the plurality of lanes in the serial communication device 40. If data of an amount equal to or larger than the preset amount is stored in each of the receiving buffer circuits, processing moves to S25 where reading from the receiving buffer circuits is started and valid data is transferred to a higher layer external to the serial communication device 40 (see FIG. 4).

On the other hand, if data of an amount equal to or larger than the preset amount is not stored in the receiving buffer circuit, processing moves to S15 where the receipt processing circuit 75 determines whether or not the "END" control code is detected on the plurality of lanes.

If the "END" control code is detected on the plurality of lanes (Yes at S15), processing moves to S25 where reading from the receiving buffer circuits is started.

On the other hand, if, when data of an amount equal to or larger than the preset, amount is not stored in each of the receiving buffer circuits on the lanes (No at S10), the "END" control code is not detected on the corresponding lanes (No at S15), processing moves to S20 where only writing to the receiving buffer circuits is performed. Processing then returns to S10 to repeat above-described processing.

When data of an amount equal to or larger than the preset amount is stored in each of the receiving buffer circuits on the lanes (Yes at S10) or when the "END" control code is detected (Yes at S15), the receipt processing circuit 75 starts reading from the receiving buffer circuits and transfers valid data to a higher layer at S25.

At S30, the receipt processing circuit 75 determines whether or not writing to the receiving buffer circuits is completed. If writing to the receiving buffer circuits is completed (Yes at S30), processing moves to S40.

The receipt processing circuit 75 performs management using a pointer value (end_ptr value) to manage the number of cells (hereinafter, "cell count") in the receiving buffer circuits between detection of last valid data and the "END" control code.

On the other hand, if writing to the receiving buffer circuits is not completed (No at S30), the receipt processing circuit 75 performs writing to the receiving buffer circuits until the "END" control code is detected at S35. Then, processing returns to S25. At this time, the receipt processing circuit 75 can detect the "END" frame a plurality of times or detect all the "END" frames.

At S40, the receipt processing circuit 75 stores the pointer (end_ptr value) to manage how many ceils there are until the "END" control code is detected. With the pointer, the receipt processing circuit 75 manages the written valid data and the redundant end frame, which is written to the receiving buffer circuit until the "END" control code is detected, as invalid data.

At S45, the receipt processing circuit 75 calculates the cell count, which is the number of cells between the last valid data and detection of the "END" control code, from the pointer value (end_ptr value).

At S50, the receipt processing circuit 75 performs reading of data stored in the receiving buffer circuits to transfer valid data to a higher layer.

After the reading is completed, at S55, when the receipt processing circuit 75 completes transferring valid data to the higher layer, the deframing, the lane-to-lane deskew, and the frequency-deviation accommodation are completed. As a result, defective data transfer resulting from an error caused by jitter noise can be prevented. Accordingly, reduction in power consumption is achievable by reducing the circuit size of a high-frequency operating circuit portion.

FIG. 7 is a diagram for describing example frame implementation and a method for detecting the position of valid data related to data transfer of the serial communication device according to the third embodiment.

Description is made with reference to FIG. 7 through an example where, in data communication using the protocol illustrated in FIG. 2, control code detection for two symbols is performed.

FIG. 7 illustrates an example where an error occurs in the "STP3", "STP4", "END2", and "END3" control codes.

Upon receiving two control codes, "STP1" and "STP2", the receipt processing circuit 75 detects timing when valid data will be transferred from the serializer 41, outputs a receiving-buffer write signal (FIG. 7) to the receiving buffer circuit, and performs writing data containing a valid data period and the "END" frame to the receiving buffer circuit. At this time, as illustrated in FIG. 7, if the receiving-buffer write signal is at high level, the receipt processing circuit 75 generates a receiving buffer address incremented by one (+1) in accordance with the clock and outputs the address to the receiving buffer circuit.

Upon receiving two control codes, "STP1" and "STP4", the receipt processing circuit 75 detects the end of the valid data. Accordingly, if an error occurs to the "END2" and "END3" control codes and the receipt processing circuit 75 cannot receive them, the receipt processing circuit 75 continues writing to the receiving buffer circuit until receiving the "END4" control code.

The receipt processing circuit 75 manages the data, between the last packet of the valid data and the "END4" control code (END_PTR), written to the receiving buffer circuit as belonging to an invalid data period and processes the data as invalid data when the data is read out from the receiving buffer circuit.

Specifically, the receipt processing circuit 75 detects timing when invalid data will be transferred from the serializer 41 and outputs an invalid-data period signal (FIG. 7) to the receiving buffer circuit. The receipt processing circuit 75 performs data writing to the receiving buffer circuit even in the invalid-data period but processes the data as invalid data when reading out the data.

As a result, data in a valid period is written to the receiving buffer circuit.

Figure 8:
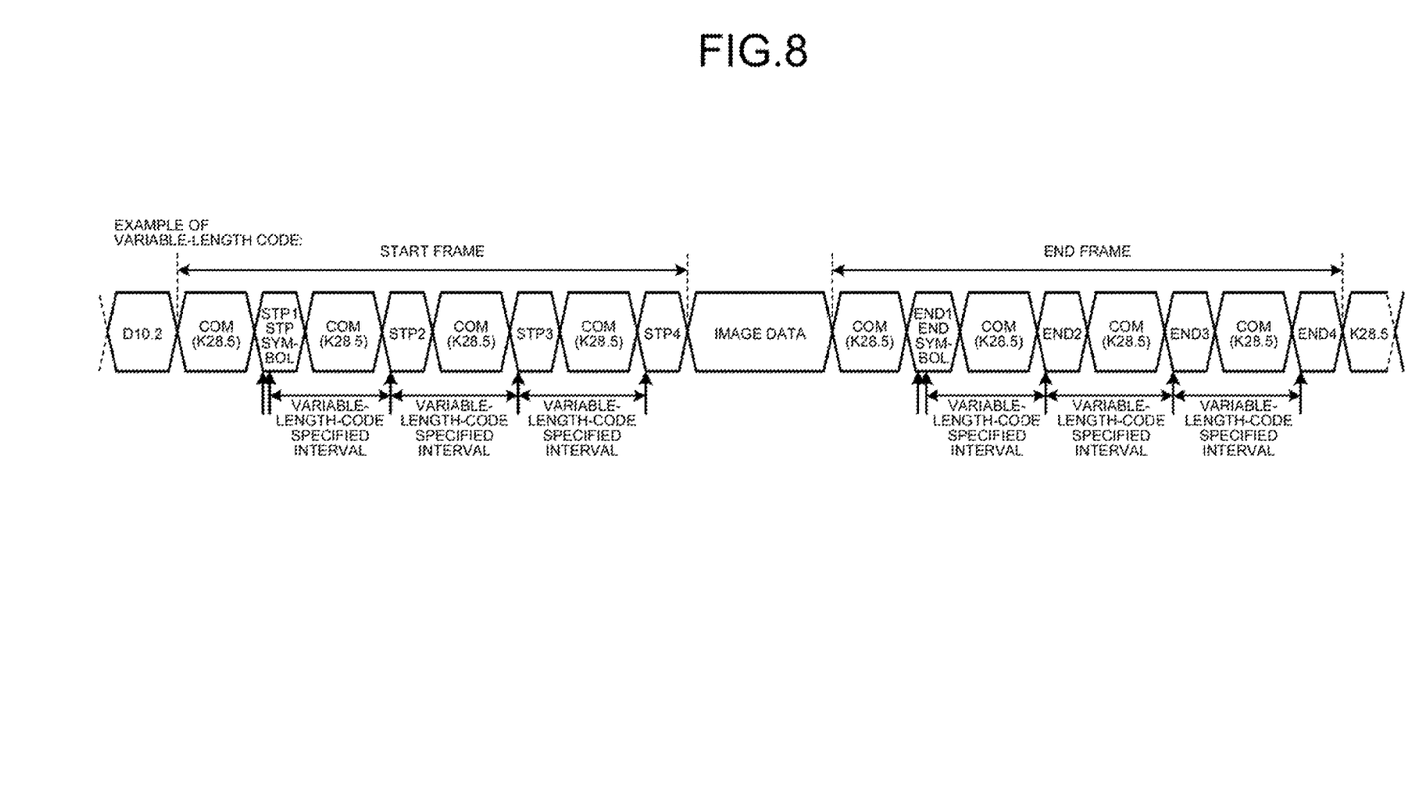
FIG. 8 is a diagram for describing example frame implementation and a data diagram related to data transfer according to the third embodiment.

FIG. 8 is a diagram for describing example frame implementation and a data diagram (variable-length specific-data) related to data transfer according to the third embodiment.

As a K code, which is standard data used in processing performed by the serial-data encoding circuit 51 and the serial-data decoding circuit 67, the control code "COM" illustrated in FIG. 8, standard data used in an 8B/10B encoding circuit, for example, is adopted for reference purpose. The 8B/10B encoding circuit achieves symbol lock by detecting the K code "COM" (K28.5).

The period between an "STP" symbol and the K code "COM" and the period between an "END" symbol and the K code "COM" are defined as variable-length-code specified intervals. Deframing is performed by not performing writing to the receiving buffer circuit 29a, 29b in the variable-length-code specified intervals.

Figure 9:
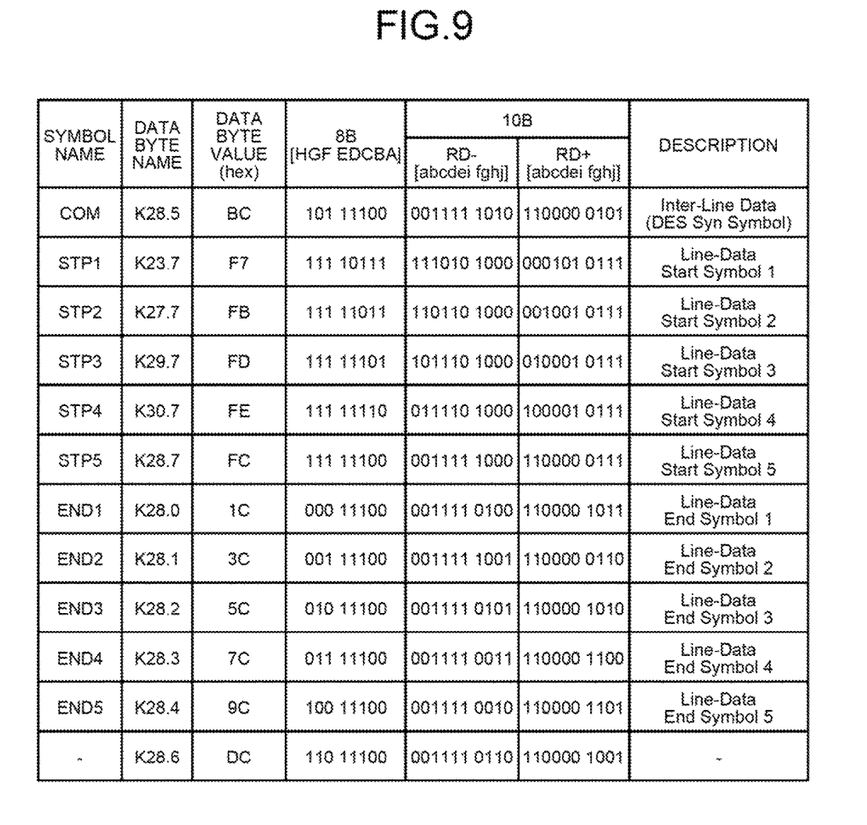
FIG. 9 is a diagram illustrating symbol codes used in an 8B/10B encoding circuit and an 8B/10B decoding circuit in the form of a table.

FIG. 9 is a diagram illustrating symbol codes used in an 8B/10B encoding circuit and an 8B/10B decoding circuit in the form of a table.

Twelve types of control codes (K codes) are assigned to the symbol codes used in the 8B/10B encoding circuit and the 8B/10B decoding circuit illustrated in FIG. 9. The "STP" and "END" control codes may be assigned as illustrated in FIG. 9.

For details of the symbol codes illustrated in FIG. 9, see U.S. Pat. No. 4,486,739.

Configurations and advantages of exemplary aspects of the present invention are described below.

First Aspect

The serial communication device 30 according to a first aspect includes the serializer 11 arranged at the transmitter and configured to transmit multiple-channel serial data over the transmission lines 20 and 20 differing on a per-channel basis, and the deserializer 21 arranged at the receiver and configured to receive the serial data. The serializer 11 includes the transmission processing circuit 13 configured to generate a protocol where a plurality of pieces of valid data is added to between a data-transmission start frame and a data-transmission end frame for each of the channels. The deserializer 21 includes the receipt processing circuit 29 configured to detect the data-transmission start frame of each of the channels and store the valid data in the receiving buffer circuits 29a and 29b provided on the per-channel basis. The receipt processing circuit 29 sets at least one of the receiving buffer circuits 29a and 29b, where the valid data is stored, on channels to be deskewed as a to-be-processed receiving buffer circuit. The receipt processing circuit 29 starts externally transferring data from the to-be-processed receiving buffer circuit when a fixed amount of the valid data is stored or when the data-transmission end frame is detected. The receipt processing circuit 29 detects a boundary between the valid data and the data-transmission end frame and extracts the valid data from the to-be-processed receiving buffer circuit.

According to the first aspect, at least one of the receiving buffer circuits 29a and 29b, where the valid data is stored, on the channels to be deskewed is set as the to-be-processed receiving buffer circuit. When a fixed amount of the valid data is stored or when the data-transmission end frame is detected, externally transferring data from the to-be-processed receiving buffer circuit is started. A boundary between the valid data and the data-transmission end frame is detected, and the valid data is extracted from the to-be-processed receiving buffer circuit. Hence, it is possible to perform, at receipt of a data packet of the protocol including the data-transmission start frame and the data-transmission end frame, deframing, inter-channel frequency deviation accommodation, and deskew simultaneously.

This leads to reduction in power consumption by reducing a circuit size of a high-frequency operating circuit portion.

Second Aspect

The receipt processing circuit 29 according to a second aspect includes the max-skew-value measurement circuit 29c configured to make comparison, between the channels, of a write point value indicating the number of cells, writing to which is completed, of the to-be-processed receiving buffer circuit or a read pointer value indicating the number of cells, reading from which is completed, and measures a maximum skew value between the channels using a result of the comparison.

According to the second aspect, the maximum skew value between the channels can be obtained by making comparison, between the channels, of the write point value or the read pointer value and measuring the maximum skew value between the channels using the result of the comparison.

Accordingly, it is possible to check the maximum skew value of the actually-operating receiving buffer circuits.

Third Aspect

The receipt processing circuit 29 according to a third aspect sets the number of storage cells of the to-be-processed receiving buffer circuit to a fixed number on the basis of the maximum skew value measured by the max-skew-value measurement circuit 29c.

According to the third aspect, because the number of storage cells of the to-be-processed receiving buffer circuit can be set to the fixed number on the basis of the maximum skew value, inter-channel maximum skew can be eliminated.

Accordingly, latency of the receiving buffer circuit can be optimized by changing the set value for the receiving buffer circuit using the maximum skew value.

Fourth Aspect

According to a fourth aspect/each of the data-transmission start frame and the data-transmission end frame contains one or more control codes, the number of which is variable.

According to the fourth aspect, it is possible to use one or more control codes, which are variable, for each of the data-transmission start frame and the data-transmission end frame.

Accordingly, it is possible to change a detection level of a burst error caused by noise by performing transfer with the number of the control codes changed by the transmission processing circuit and detecting, by the receipt processing circuit, a data-transfer start frame for a checking purpose.

Fifth Aspect

According to a fifth aspect, at least any one of the data-transmission start frame and the data-transmission end frame contains a plurality of control codes and specific data, in which the specific data is inserted to between two of the control codes.

According to the fifth aspect, because the specific data is inserted to between two control codes in the data-transmission start frame and/or the data-transmission end frame, it is possible to change a detection level of a burst error caused by noise by performing transfer with the plurality of control codes, the number of which is variable, implemented by the transmission processing circuit and detecting, by the receipt processing circuit, a data-transfer start frame for a checking purpose.

Sixth Aspect

According to a sixth aspect, at least any one of the data-transmission start frame and the data-transmission end frame contains at least one control code and specific data of a desired length.

According to the sixth aspect, because the data-transmission start frame and/or the data-transmission end frame contains at least one control code and specific data of a desired length, it is possible to add specific data, such as the "COM" symbol, of a desired length. Accordingly, even if bit slip should occur during transfer of control data, a boundary between symbols can be detected, whereby recovery is enabled.

Seventh Aspect

According to a seventh aspect, the data-transmission start frame contains a plurality of "STP" symbols indicating a start of valid data, the data-transmission end frame contains a plurality of "END" symbols indicating an end of the valid data, and the receipt processing circuit determines that a valid-data start code is detected upon detecting all or a detection threshold number of the plurality of "STP" symbols and determines that a valid-data end code is detected upon detecting all or a detection threshold number of the plurality of "END" symbols.

According to the seventh aspect, it is determined that the valid-data start code is detected when all or the detection threshold number of the plurality of "STP" symbols are detected, and it is determined that the valid-data end code is detected when all or the detection threshold number of the plurality of "END" symbols are detected. Accordingly, it is possible to detect a valid-data start code and a valid-data end code.

Because start of data transfer can be detected by detecting all or the detection threshold number of the "STP" symbols or the "END" symbols, highly-reliable detection of data transfer can be achieved.

Eighth Aspect

According to an eighth aspect, the detection threshold number is variable.

According to the eighth aspect, because the detection threshold number is variable, it is possible to use the serial communication device differently depending on application.

Ninth Aspect

According to a ninth aspect, when starting connection with the deserializer 21, the serializer 11 transmits a notice, which is contained in the data-transmission start frame or the data-transmission end frame, containing the number of the "STP" symbols and the length of a specific symbol between the "STP" symbols to the deserializer.

According to the ninth aspect, when starting connection, the serializer 11 transmits the notice, which is contained in the data-transmission start frame or the data-transmission end frame, containing the number of the "STP" symbols and the length of the specific symbol between the "STP" symbols to the deserializer. Accordingly, implementation can be made independent of the number of the "STP" symbols and the length of the specific symbol between the "STP" symbols, which are set at initial settings of the serial communication device.

Tenth Aspect

A serial communication method according to a tenth aspect is to be performed by the serial communication device 10 including the serializer 11 arranged at the transmitter and configured to transmit multiple-channel serial data over the transmission lines 20 and 20 differing on a per-channel basis, and the deserializer 21 arranged at the receiver and configured to receive the serial data. The serializer 11 includes the transmission processing circuit 13 configured to generate a protocol where a plurality of pieces of valid data is added to between a data-transmission start frame and a data-transmission end frame for each of the channels. The deserializer 21 includes the receipt processing circuit 29 configured to detect the data-transmission start frame of each of the channels and store valid data in the receiving buffer circuits 29a and 29b provided on the per-channel basis. The serial communication method includes setting, by the receipt processing circuit 29, at least one of the receiving buffer circuits, where the valid data is stored, on channels to be deskewed as a to-be-processed receiving buffer circuit, and starting, by the receipt processing circuit 29, externally transferring data from the to-be-processed receiving buffer circuit when a fixed amount of the valid data is stored or when the data-transmission end frame is detected (S10, S15, S25), and detecting, by the receipt processing circuit 29, a boundary between the valid data and the data-transmission end frame and extracts the valid data from the to-be-processed receiving buffer circuit (S45).

According to the tenth aspect, at least one of the receiving buffer circuits 29a and 29b, where the valid data is stored, on the channels to be deskewed is set as the to-be-processed receiving buffer circuit. Externally transferring data from the to-be-processed receiving buffer circuit is started when the fixed amount of the valid data is stored or when the data-transmission end frame is detected. A boundary between the valid data and the data-transmission end frame is detected, and the valid data is extracted from the to-be-processed receiving buffer circuit. Accordingly, it is possible to perform, at receipt of a data packet of the protocol including the data-transmission start frame and the data-transmission end frame, deframing, inter-channel frequency deviation accommodation, and deskew simultaneously.

This leads to reduction in power consumption by reducing the circuit size of a high-frequency operating circuit portion.

According to an aspect of the present invention, reduction in power consumption is achievable.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A serial communication device comprising:
   a serializer configured to transmit serial data for each of a plurality of channels via a transmission line for the corresponding channel; and
   a deserializer configured to receive the serial data,
   the serializer including a transmission processing circuit configured to create a protocol where a plurality of pieces of valid data are inserted between a data-transmission start frame and a data-transmission end frame for each of the channels,
   the deserializer including a receipt processing circuit for the plurality of channels, the receipt processing circuit including a plurality of receiving buffer circuits for the respective channels,
   the receipt processing circuit being configured to detect, for each channel amongst the plurality of channels, the data-transmission start frame of the channel and store the valid data in the corresponding receiving buffer circuit assigned to the channel,
   set, as a to-be-processed receiving buffer circuit, at least one of the receiving buffer circuits that stores the valid data on a channel to be deskewed,
   start externally transferring data from the to-be-processed receiving buffer circuit when a fixed amount of the valid data is stored or when the data-transmission end frame is detected,
   detect a boundary between the valid data and the data-transmission end frame, and
   extract the valid data from the to-be-processed receiving buffer circuit,
   wherein the receipt processing circuit further includes a max-skew-value measurement circuit configured to make comparison, between the channels, of a write point value indicating the number of cells, writing to which is completed, of the to-be-processed receiving buffer circuit or a read pointer value indicating the number of cells, reading from which is completed, of the to-be-processed receiving buffer circuit, and
   measure a maximum skew value in the channels by using a result of the comparison, and
   wherein the receipt processing circuit sets the number of storage cells of the to-be-processed receiving buffer circuit to a fixed number based on the maximum skew value.

2. The serial communication device according to claim 1, wherein each of the data-transmission start frame and the data-transmission end frame contains one or more control codes, the number of control codes being variable.

3. The serial communication device according to claim 1, wherein at least one of the data-transmission start frame and the data-transmission end frame contains a plurality of control codes and specific data, the specific data being inserted between two of the control codes.

4. The serial communication device according to claim 1, wherein at least one of the data-transmission start frame and the data-transmission end frame contains at least one control code and specific data of a desired length.

5. The serial communication device according to claim 1, wherein
   the data-transmission start frame contains a plurality of "STP" symbols indicating start of valid data,
   the data-transmission end frame contains a plurality of "END" symbols indicating end of the valid data, and
   the receipt processing circuit detects all or a detection threshold number of the plurality of "STP" symbols to determine the "STP" symbols as a valid-data start code, and detects all or a detection threshold number of the plurality of "END" symbols to determine the "END" symbols as a valid-data end code.

6. The serial communication device according to claim 5, wherein the detection threshold number is variable.

7. The serial communication device according to claim 5, wherein when starting connection with the deserializer, the serializer transmits a message containing the number of "STP" symbols and a length of a specific symbol between the "STP" symbols to the deserializer, the message being contained in any one of the data-transmission start frame and the data-transmission end frame.

8. A serial communication method performed by a serial communication device that includes a serializer configured to transmit serial data for each of a plurality of channels via a transmission line for the corresponding channel, and a deserializer configured to receive the serial data, the deserializer including a receipt processing circuit for the plurality of channels, the receipt processing circuit including a max-skew-value measurement circuit and a plurality of receiving buffer circuits for the respective channels, the serial communication method comprising:
   creating, by the serializer, a protocol where a plurality of pieces of valid data are inserted between a data-transmission start frame and a data-transmission end frame for each of the channels;
   detecting, by the receipt processing circuit and for each channel amongst the plurality of channels, the data-transmission start frame of the channel and storing, by the deserializer, the valid data in the corresponding receiving buffer circuit assigned to the channel;
   setting, as a to-be-processed receiving buffer circuit, at least one of the receiving buffer circuits that stores the valid data on a channel to be deskewed,
   starting externally transferring data from the to-be-processed receiving buffer circuit when a fixed amount of the valid data is stored or when the data-transmission end frame is detected;
   detecting a boundary between the valid data and the data-transmission end frame; and
   extracting the valid data from the to-be-processed receiving buffer circuit,
   the max-skew-value measurement circuit comparing, between the channels, a write point value indicating the number of cells, writing to which is completed, of the to-be-processed receiving buffer circuit or a read pointer value indicating the number of cells, reading from which is completed, of the to-be-processed receiving buffer circuit, and
   measuring a maximum skew value in the channels by using a result of the comparison, and setting, by the receipt processing circuit, the number of storage cells of the to-be-processed receiving buffer circuit to a fixed number based on the maximum skew value.

* * * * *